(12) United States Patent
Gaulden et al.

(10) Patent No.: US 10,260,356 B2
(45) Date of Patent: Apr. 16, 2019

(54) NOZZLE COOLING SYSTEM FOR A GAS TURBINE ENGINE

(71) Applicant: General Electric Company, Schenectady, NY (US)

(72) Inventors: Travis Michael Gaulden, Greenville, SC (US); Gary Michael Itzel, Simpsonville, SC (US); Robert Carl Meyer, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 364 days.

(21) Appl. No.: 15/171,172

(22) Filed: Jun. 2, 2016

(65) Prior Publication Data

US 2017/0350258 A1    Dec. 7, 2017

(51) Int. Cl.
*F01D 5/08*         (2006.01)
*F01D 5/18*         (2006.01)
(Continued)

(52) U.S. Cl.
CPC ............. *F01D 5/187* (2013.01); *F01D 5/081* (2013.01); *F01D 5/084* (2013.01); *F01D 5/087* (2013.01); *F01D 25/12* (2013.01); *F02C 3/04* (2013.01); *F05D 2220/32* (2013.01); *F05D 2260/201* (2013.01)

(58) Field of Classification Search
CPC .......... F01D 5/084; F01D 5/187; F01D 5/081; F01D 5/087; F01D 25/12; F05D 2220/32; F05D 2260/201; F02C 3/04
See application file for complete search history.

(56) References Cited

U.S. PATENT DOCUMENTS 5,197,852 A * 3/1993 Walker ................... F01D 9/065
                                                             415/115
6,079,199 A    6/2000 McCaldon et al.
(Continued)

FOREIGN PATENT DOCUMENTS

EP           1 143 109 A2    10/2001

OTHER PUBLICATIONS

Extended European Search Report and Opinion issued in connection with corresponding EP Application No. 17172397.6 dated Nov. 8, 2017.

*Primary Examiner* — Jessica Cahill
(74) *Attorney, Agent, or Firm* — Dority & Manning, P.A.

(57) ABSTRACT

The present disclosure is directed to a nozzle cooling system for a gas turbine engine. An impingement plate is positioned radially inwardly from a radially inner surface of an inner side wall of a nozzle. The impingement plate and the inner side wall collectively define an inner chamber. The impingement plate includes a first portion defining one or more impingement apertures and a second portion defining one or more post-impingement apertures. A duct plate encloses the first portion of the impingement plate. The duct plate, the first portion of the impingement plate, and inner side wall collectively define an outer chamber in fluid communication with the inner chamber through the one or more impingement apertures. Compressed air from the outer chamber flows through the one or more impingement apertures into the inner chamber and exits the inner chamber through the one or more post-impingement apertures.

18 Claims, 8 Drawing Sheets

(51) Int. Cl.
*F01D 25/12* (2006.01)
*F02C 3/04* (2006.01)

(56) References Cited

U.S. PATENT DOCUMENTS

| | | | |
|---|---|---|---|
| 6,259,064 B1 | 7/2001 | Wilson | |
| 6,386,825 B1 | 5/2002 | Burdgick | |
| 6,419,445 B1 | 7/2002 | Burdgick | |
| 6,506,013 B1 | 1/2003 | Burdgick et al. | |
| 6,843,637 B1 | 1/2005 | Pothier et al. | |
| 8,459,935 B1 | 6/2013 | Liang | |
| 8,608,430 B1 | 12/2013 | Liang | |
| 8,851,845 B2 | 10/2014 | Brittingham et al. | |
| 8,876,464 B1 | 11/2014 | Jones et al. | |
| 8,944,751 B2 | 2/2015 | Winn et al. | |
| 9,011,079 B2 | 4/2015 | Coign et al. | |
| 2005/0268615 A1* | 12/2005 | Bunker | F23R 3/002 60/772 |
| 2006/0056968 A1* | 3/2006 | Jacala | F01D 5/18 416/97 R |
| 2006/0269409 A1* | 11/2006 | Torii | F01D 5/187 416/97 R |
| 2007/0134099 A1* | 6/2007 | Lee | F01D 5/22 416/193 A |
| 2012/0082548 A1* | 4/2012 | Ellis | F01D 5/087 416/95 |
| 2014/0338364 A1 | 11/2014 | Johns et al. | |
| 2017/0101932 A1* | 4/2017 | Stover | F01D 5/189 |
| 2017/0292455 A1* | 10/2017 | VanTassel | F01D 25/24 |

\* cited by examiner

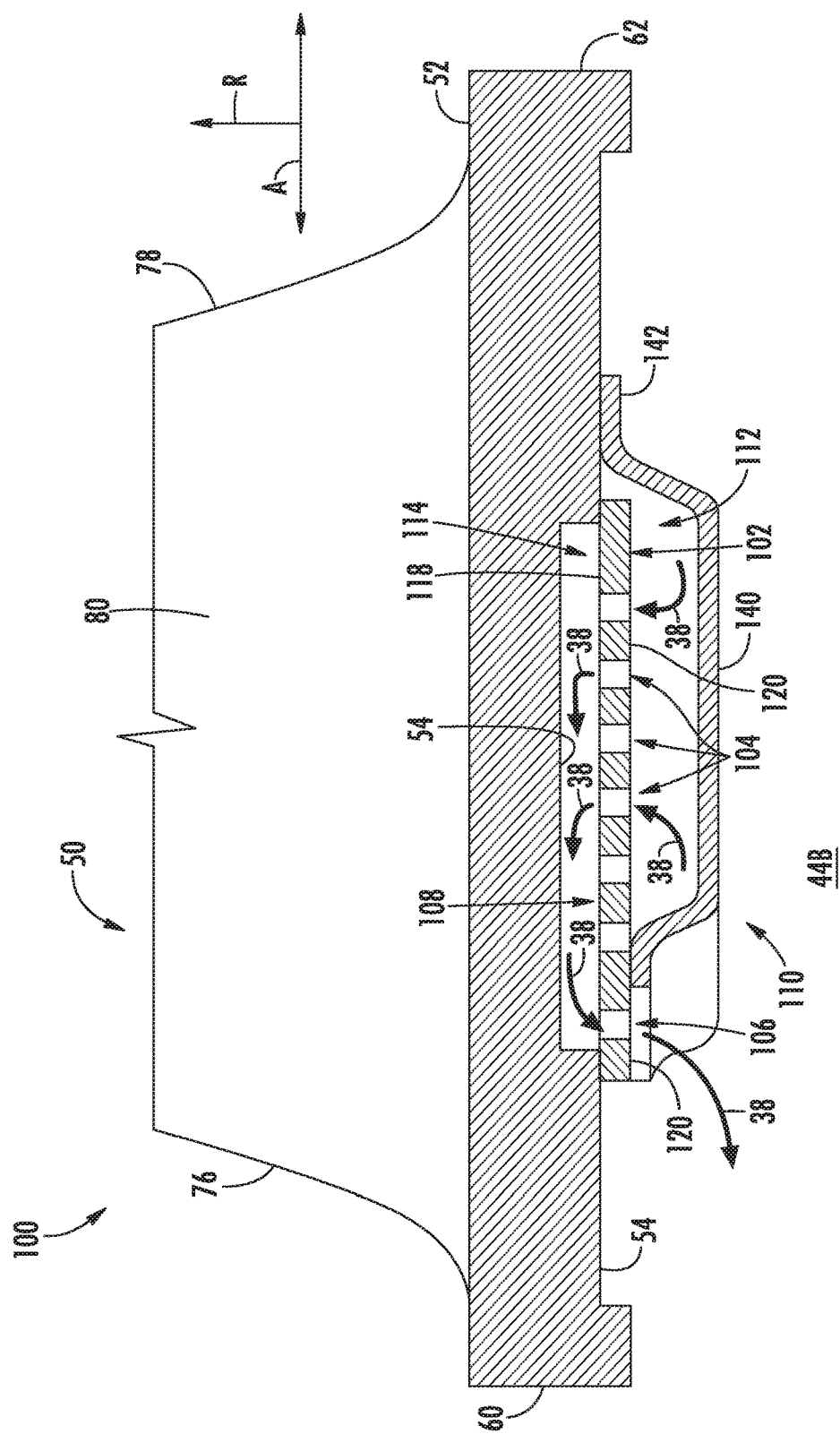

NOZZLE COOLING SYSTEM FOR A GAS TURBINE ENGINE

FIELD OF THE TECHNOLOGY

The present disclosure generally relates to a gas turbine engine. More particularly, the present disclosure relates to a nozzle cooling system for a gas turbine engine.

BACKGROUND

A gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

The turbine section includes one or more turbine nozzles, which direct the flow of combustion gases onto one or more turbine rotor blades. The one or more turbine rotor blades, in turn, extract kinetic energy and/or thermal energy from the combustion gases, thereby driving the rotor shaft. Generally, each of the one or more turbine nozzles includes an inner side wall having a radially outer surface in contact with the combustion gases and a radially inner surface isolated from the combustion gases. Since the radially outer surfaces of each of the inner side walls are in direct contact with the combustion gases, it may be necessary to provide cooling air thereto.

In certain configurations, the gas turbine engine may include systems that direct cooling air onto the radially inner surfaces of the inner side walls. The spent cooling air is typically exhausted through one or more apertures extending through the inner side walls. Nevertheless, apertures defined by the inner side walls are expensive to form and increase the overall cost of the gas turbine engine.

BRIEF DESCRIPTION OF THE TECHNOLOGY

Aspects and advantages of the technology will be set forth in part in the following description, or may be obvious from the description, or may be learned through practice of the technology.

In one aspect, the present disclosure is directed to a nozzle cooling system for a gas turbine engine that includes a nozzle having an inner side wall. The inner side wall includes a radially inner surface and a radially outer surface. An impingement plate is positioned radially inwardly from the radially inner surface of the inner side wall. The impingement plate and the inner side wall collectively define an inner chamber. The impingement plate includes a first portion defining one or more impingement apertures and a second portion defining one or more post-impingement apertures. A duct plate encloses the first portion of the impingement plate. The duct plate, the first portion of the impingement plate, and inner side wall collectively define an outer chamber in fluid communication with the inner chamber through the one or more impingement apertures. Compressed air from the outer chamber flows through the one or more impingement apertures into the inner chamber and exits the inner chamber through the one or more post-impingement apertures.

A further aspect of the present disclosure is directed to a gas turbine engine that includes a compressor section, a combustion section, and a turbine section. The turbine section includes a nozzle having an inner side wall, an outer side wall, and an airfoil extending between the inner side wall and the outer side wall. The inner side wall includes a radially inner surface and a radially outer surface. An impingement plate is positioned radially inwardly from the radially inner surface of the inner side wall. The impingement plate and the inner side wall collectively define an inner chamber. The impingement plate includes a first portion defining one or more impingement apertures and a second portion defining one or more post-impingement apertures. A duct plate encloses the first portion of the impingement plate. The duct plate, the first portion of the impingement plate, and the inner side wall collectively define an outer chamber in fluid communication with the inner chamber through the one or more impingement apertures. Compressed air from the outer chamber flows through the one or more impingement apertures into the inner chamber and exits the inner chamber through the one or more post-impingement apertures.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended FIGS., in which:

FIG. 9 is a cross-sectional view of the nozzle cooling system taken generally about line 9-9 in FIG. 5, further illustrating the operation thereof.

Figure 1:
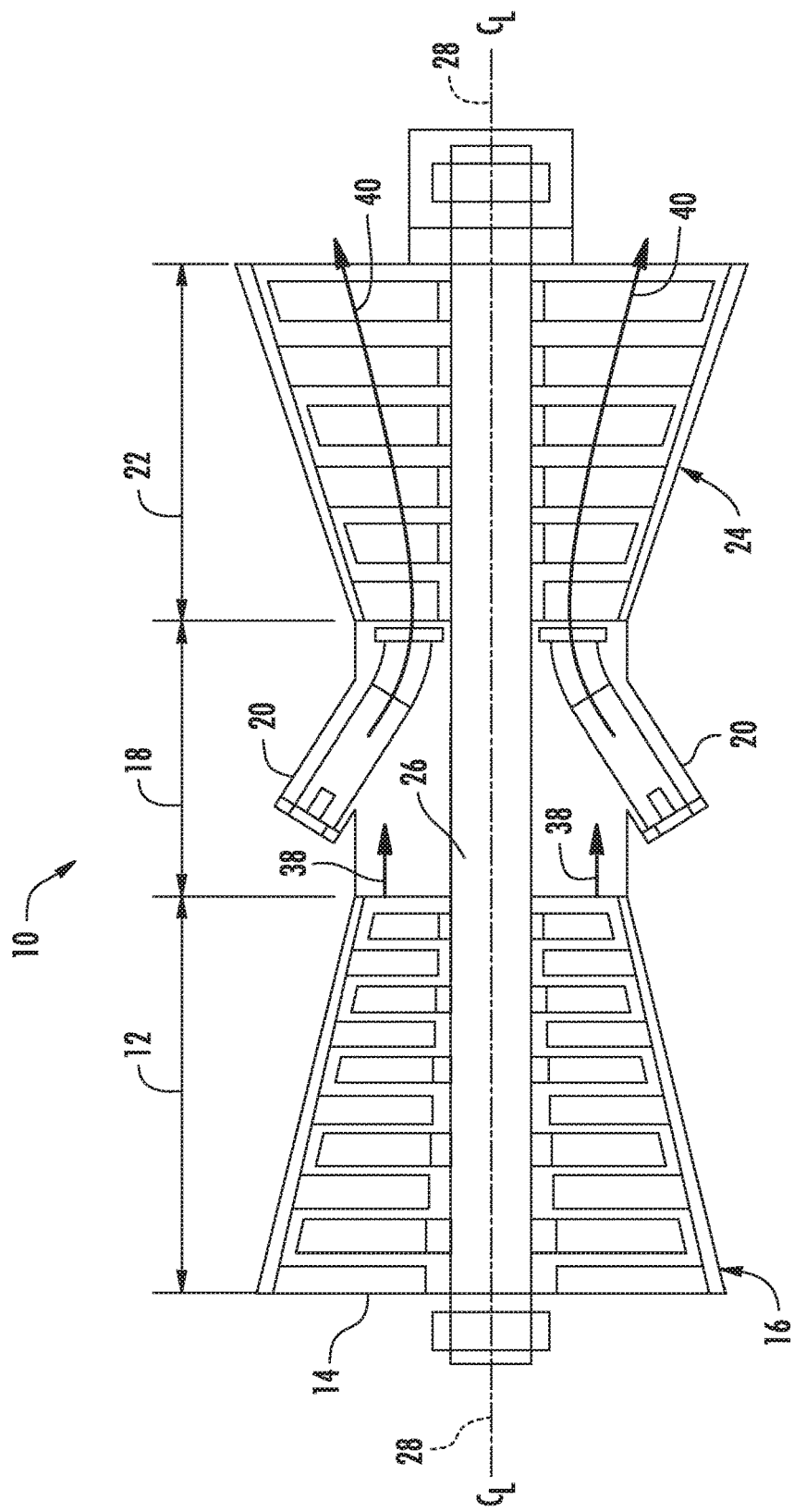
FIG. 1 is a schematic view of an exemplary gas turbine engine that may incorporate various embodiments disclosed herein.

Repeat use of reference characters in the present specification and drawings is intended to represent the same or analogous features or elements of the present technology.

DETAILED DESCRIPTION OF THE TECHNOLOGY

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents. Although an industrial or land-based gas turbine is shown and described herein, the present technology as shown and described herein is not limited to a land-based and/or industrial gas turbine unless otherwise specified in the claims. For example, the technology as described herein may be used in any type of turbine including, but not limited to, aviation gas turbines (e.g., turbofans, etc.), steam turbines, and marine gas turbines.

Referring now to the drawings, FIG. 1 is a schematic view of an exemplary gas turbine engine 10 that may incorporate various embodiments disclosed herein. As shown, the gas turbine engine 10 generally includes a compressor section 12 having an inlet 14 disposed at an upstream end of a compressor 16 (e.g., an axial compressor). The gas turbine engine 10 also includes a combustion section 18 having one or more combustors 20 positioned downstream from the compressor 16. The gas turbine engine 10 further includes a turbine section 22 having a turbine 24 (e.g., an expansion turbine) disposed downstream from the combustion section 18. A rotor shaft 26 extends axially through the compressor 16 and the turbine 24 along an axial centerline 28 of the gas turbine engine 10.

Figure 2:
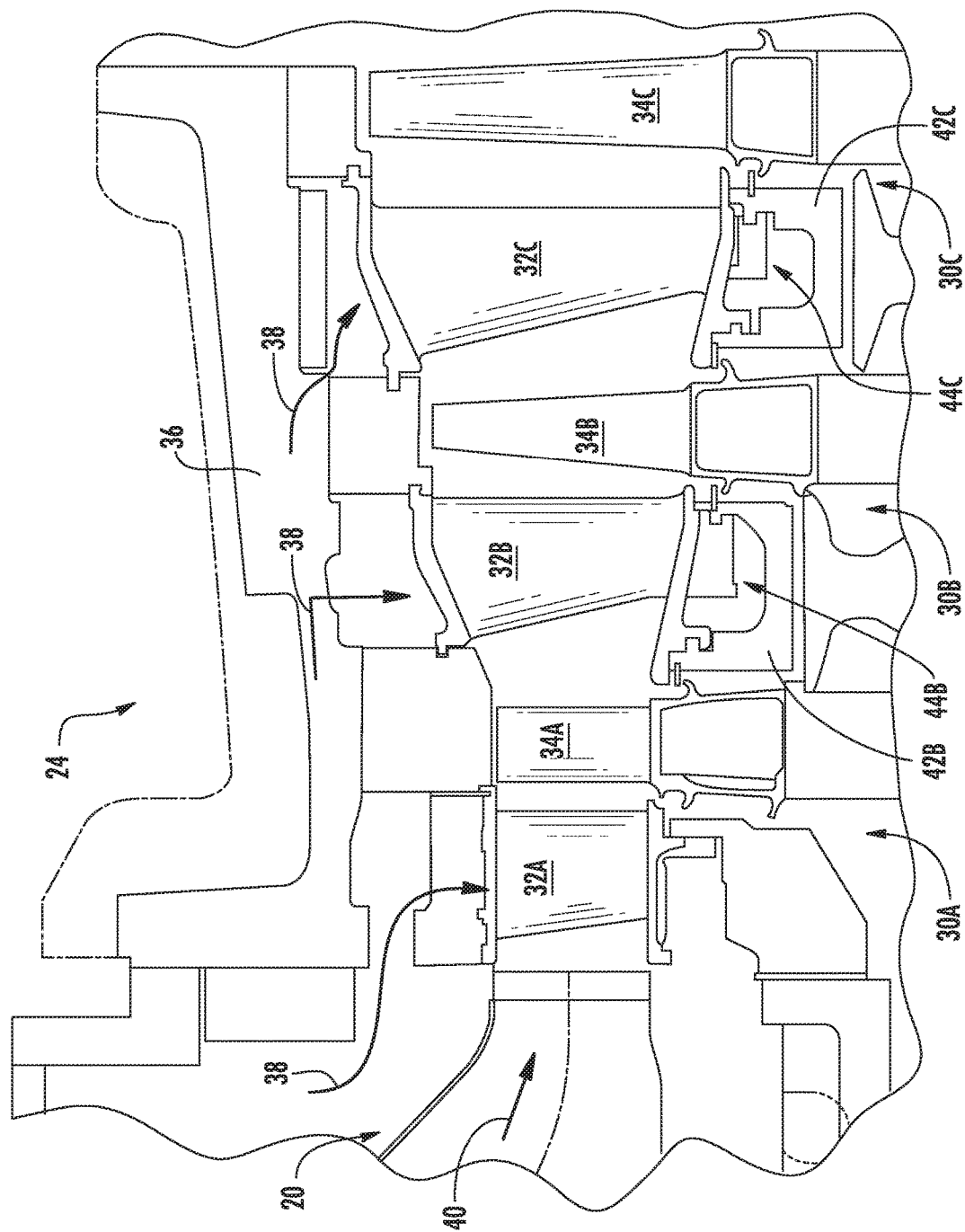
FIG. 2 is a diagrammatic view of an exemplary turbine section that may be incorporated in the gas turbine engine shown in FIG. 1 and may incorporate various embodiments disclosed herein.

FIG. 2 is a cross-sectional side view of the turbine 24 that may incorporate various embodiments disclosed herein. As shown in FIG. 2, the turbine 24 may include multiple turbine stages. For example, the turbine 24 may include a first stage 30A, a second stage 30B, and a third stage 30C. Although, the turbine 24 may include more or less turbine stages as is necessary or desired.

Each stage 30A-30C includes, in serial flow order, a corresponding row of turbine nozzles 32A, 32B, and 32C and a corresponding row of turbine rotor blades 34A, 34B, and 34C axially spaced apart along the rotor shaft 26 (FIG. 1). Each of the turbine nozzles 32A-32C remains stationary relative to the turbine rotor blades 34A-34C during operation of the gas turbine 10. Each of the rows of turbine nozzles 32B, 32C is respectively coupled to a corresponding diaphragm 42B, 42C. Although not shown in FIG. 2, the row of turbine nozzles 32A may also couple to a diaphragm. Each turbine nozzle 32B, 32C and the corresponding diaphragms 42B, 42C collectively define a corresponding diaphragm cavity 44B, 44C therebetween. A casing or shell 36 circumferentially surrounds each stage 30A-30C of the turbine nozzles 32A-32C and the turbine rotor blades 34A-34C.

As illustrated in FIGS. 1 and 2, the compressor 16 provides compressed air 38 to the combustors 20. The compressed air 38 mixes with fuel (e.g., natural gas) in the combustors 20 and burns to create combustion gases 40, which flow into the turbine 24. The turbine nozzles 32A-32C and turbine rotor blades 34A-34C extract kinetic and/or thermal energy from the combustion gases 40. This energy extraction drives the rotor shaft 26. The combustion gases 40 then exit the turbine 24 and the gas turbine engine 10. As will be discussed in greater detail below, a portion of the compressed air 38 may be used as a cooling medium for cooling the various components of the turbine 24 including, inter alia, the turbine nozzles 32A-32C.

Figure 3:
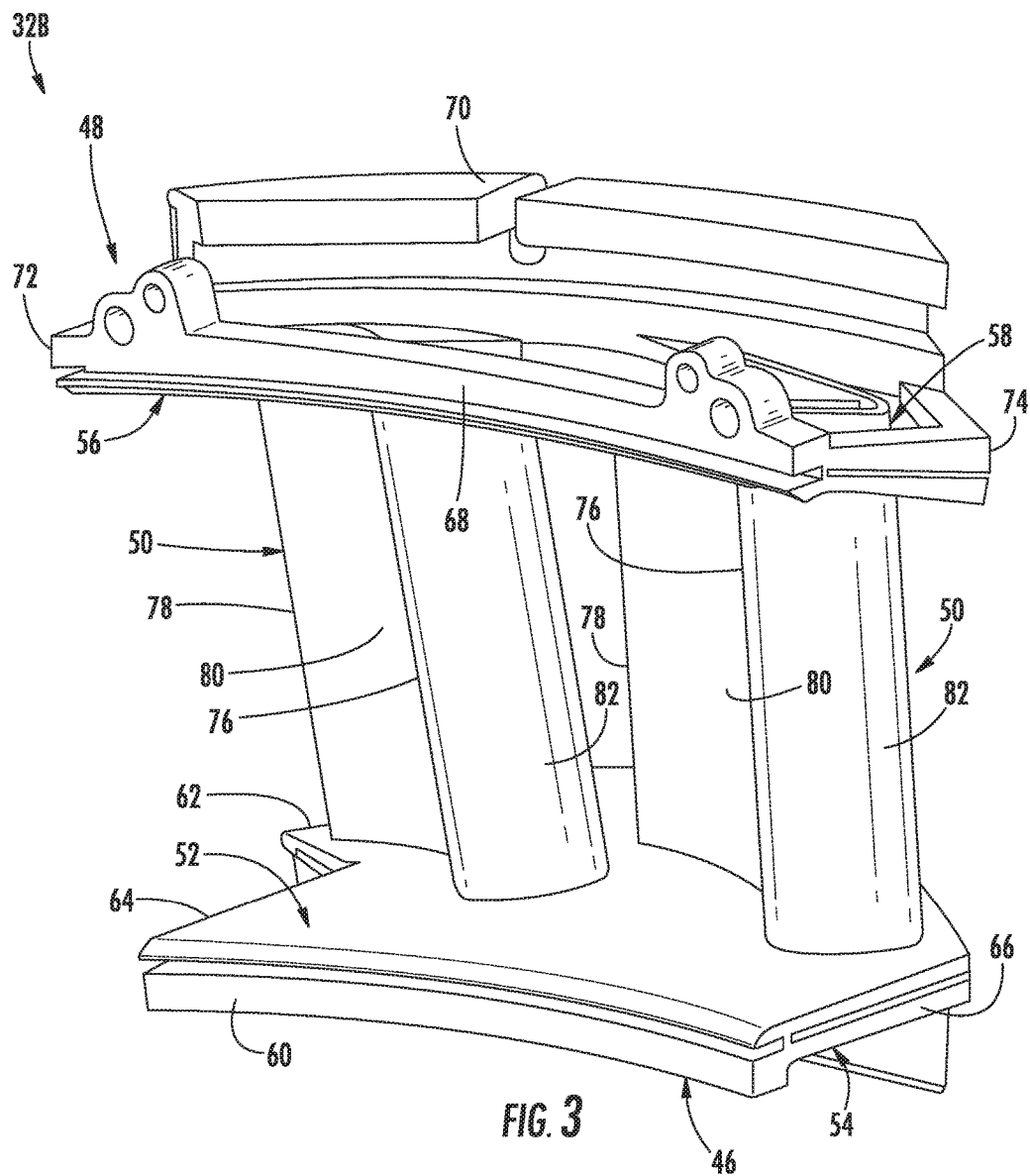
FIG. 3 is a perspective view of an exemplary nozzle that may be incorporated into the turbine section shown in FIG. 2 and may incorporate various embodiments disclosed herein.

FIG. 3 is a perspective view of the turbine nozzle 32B of the second stage 30B, which may also be known in the industry as the stage two nozzle or S2N. The other turbine nozzles 32A, 32C include features similar to those of the turbine nozzle 32B, which will be discussed in greater detail below. As shown in FIG. 3, the turbine nozzle 32B includes an inner side wall 46 and an outer side wall 48 radially spaced apart from the inner side wall 46. A pair of airfoils 50 extends in span from the inner side wall 46 to the outer side wall 48. In this respect, the turbine nozzle 32B illustrated in FIG. 3 is referred to in the industry as a doublet. Nevertheless, the turbine nozzle 32B may have only one airfoil 50 (i.e., a singlet), three airfoils 50 (i.e., a triplet), or a more airfoils 50.

As illustrated in FIG. 3, the inner and the outer side walls 46, 48 include various surfaces. More specifically, the inner side wall 46 includes a radially outer surface 52 and a radially inner surface 54 positioned radially inwardly from the radially outer surface 52. Similarly, the outer side wall 48 includes a radially inner surface 56 and a radially outer surface 58 oriented radially outwardly from the radially inner surface 56. As shown in FIGS. 2 and 3, the radially inner surface 56 of the outer side wall 48 and the radially outer surface 52 of the inner side wall 46 respectively define inner and outer radial flow boundaries for the combustion gases 40 flowing at high velocity through the turbine 24. The inner side wall 46 also includes a forward surface 60 and an aft surface 62 positioned downstream from the forward surface 60. The inner side wall 46 further includes a first circumferential surface 64 and a second circumferential surface 66 circumferentially spaced apart from the first circumferential surface 64. Similarly, the outer side wall 48 includes a forward surface 68 and an aft surface 70 positioned downstream from the forward surface 68. The outer side wall 48 also includes a first circumferential surface 72 and a second circumferential surface 74 spaced apart from the first circumferential surface 72. The inner and the outer side walls 46, 48 are preferably constructed from a nickel-based superalloy or another suitable material capable of withstanding the combustion gases 40.

As mentioned above, two airfoils 50 extend from the inner side wall 46 to the outer side wall 48. Each airfoil 50 includes a leading edge 76 disposed proximate to forward surfaces 60, 68 of the inner and outer side walls 46, 48. Each airfoil 50 also includes a trailing edge 78 disposed proximate to aft surfaces 62, 70 of the inner and outer side walls 46, 48. Furthermore, each airfoil 50 includes a pressure side wall 80 and an opposing suction side wall 82 extending from the leading edge 76 to the trailing edge 78. The airfoils 50 are preferably constructed from a nickel-based superalloy or another suitable material capable of withstanding the combustion gases 40.

Figure 4:
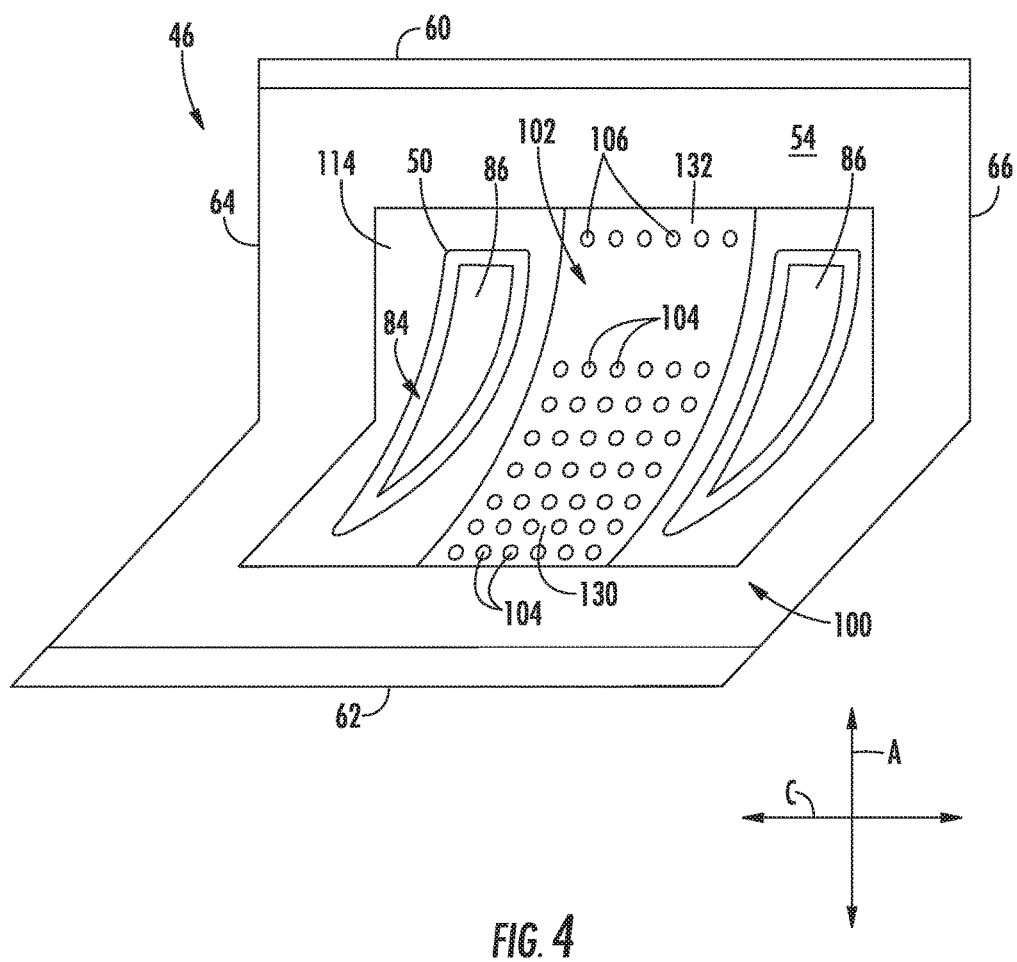
FIG. 4 is a bottom view of an inner side wall of the nozzle shown in FIG. 3, illustrating one embodiment of a nozzle cooling system as disclosed herein.

FIG. 4 is a bottom view of the inner side wall 46, further illustrating a pair of airfoil passages 84. More specifically, each of the airfoils 50 defines a corresponding airfoil passage 84 extending therethrough. The airfoil passages 84 also extend through the inner and outer side walls 46, 48. In this respect, the portion of the compressed air 38 disposed radially outwardly from the turbine nozzle 32B shown in FIG. 2 may flow through the airfoil passages 50 to the diaphragm cavity 44B. In the embodiment shown in FIG. 4, a core 86 is positioned in each of the airfoil passages 50. As such, the airfoil passages 50 have an annular shape in the embodiment shown in FIG. 4. Nevertheless, the airfoil passages 50 may be devoid of any cores 86 and may have any suitable cross-sectional shape in other embodiments.

FIGS. 4-9 illustrate embodiments of a nozzle cooling system 100 that may be incorporated into the gas turbine engine 10. As depicted therein, the nozzle cooling system 100 defines an axial direction A, a radial direction R, and a circumferential direction C. In general, the axial direction A extends parallel to the axial centerline 28 (FIG. 1), the radial direction R extends orthogonally outward from the axial centerline 28, and the circumferential direction C extends concentrically around the axial centerline 28.

As discussed in greater detail below, the nozzle cooling system 100 cools the inner side wall 46 of the turbine nozzle 32A. More specifically, the nozzle cooling system 100 includes an impingement plate 102 defining one or more impingement apertures 104 and one or more post-impingement apertures 106. The impingement plate 102 is positioned radially inwardly from and is at least partially radially spaced apart from the radially inner surface 54 of the inner side wall 46. In this respect, the impingement plate 102 and the inner side wall 46 define an inner chamber 108 therebetween. A duct plate 110 encloses a first portion 130 of the impingement plate 102. As such, the duct plate 110, the first portion 130 the impingement plate 102, and the inner side wall 46 define an outer chamber 112 therebetween. The compressed air 38 flowing through the airfoil passages 84 enters the outer chamber 112. The compressed air 38 then flows through the one or more impingement apertures 104 in the impingement plate 102 into the inner chamber 108. The one or more impingement apertures 104 direct the compressed air 38 onto the radially inner surface 54 of the inner side wall 46, thereby cooling the inner side wall 46. The compressed air 38 then exits the inner chamber 108 through the one or more post-impingement apertures 106 and flows into the diaphragm cavity 44B.

In the embodiment shown in FIG. 4, the inner side wall 46 defines a depression 114. As such, a portion of the radially inner surface 54 of the inner side wall 46 (i.e., the portion disposed in the depression 114) may be radially spaced apart from another portion of radially inner surface 54 (i.e., the portion not positioned in the depression 114) as shown in FIG. 9. In the embodiment shown in FIG. 4, the depression 114 has the same shape as the inner side wall 46. Although, the depression 114 may have other shapes as well. The airfoils 50 are axially and circumferentially aligned with the depression 114. As such, the airfoil passages 84 are in fluid communication with the depression 114. Other embodiments of the inner side wall 46 may not define the depression 114.

Figure 7:
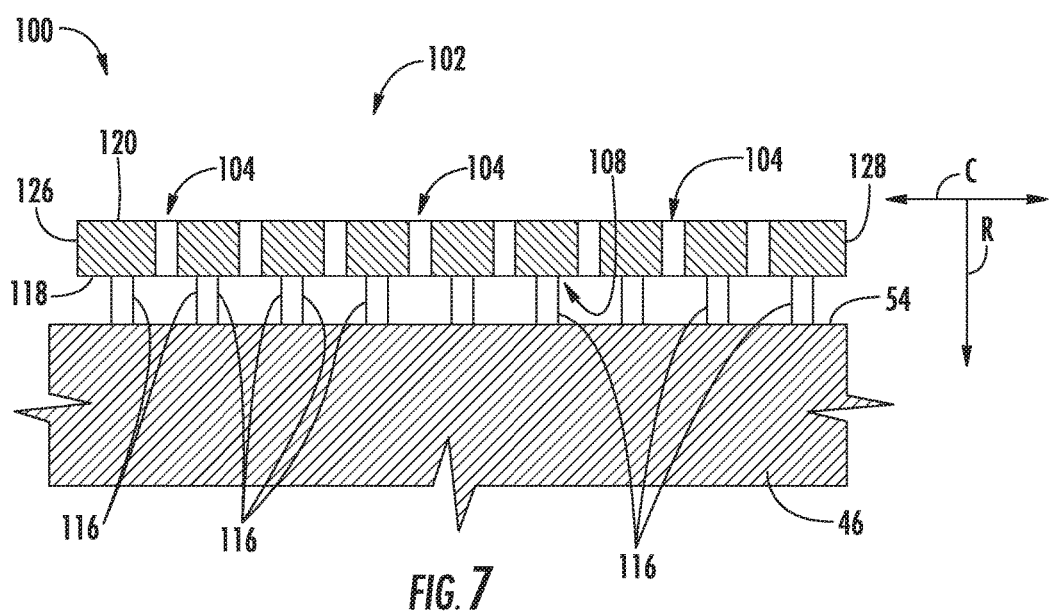
FIG. 7 is a cross-sectional view of the impingement plate taken generally about line 7-7 in FIG. 6, further illustrating the features thereof.

FIG. 4 illustrates one embodiment of the positioning of the impingement plate 102 on the radially inner surface 54 of the inner side wall 46. More specifically, the impingement plate 102 is positioned axially between the forward and the aft surfaces 60, 62 of the inner side wall 46 and circumferentially between the two airfoils 50. The impingement plate 102 is also positioned radially inwardly from the radially inner surface 54. In one embodiment, the impingement plate 102 is entirely radially spaced apart from the radially inner surface 54 by one or more posts 116 as illustrated in FIG. 7. As illustrated in FIG. 9, however, the impingement plate 102 may also be radially spaced apart from only a portion of the radially inner surface 54 by the depression 114 in other embodiments. That is, the impingement plate 102 may be radially spaced apart from the portion of the radially inner surface 54 positioned in the depression 114, while the impingement plate 102 is in contact with the portion of the radially inner surface 54 disposed outside of the depression 114. The one or more posts 116 may also be used in addition to or in lieu of the depression 114 to partially radially space the impingement plate 102 apart from the radially inner surface 54. Nevertheless, the impingement plate 102 may be positioned in other configurations or orientations with respect to the radially inner surface 54 of the inner side wall 46 as well.

Figure 6:
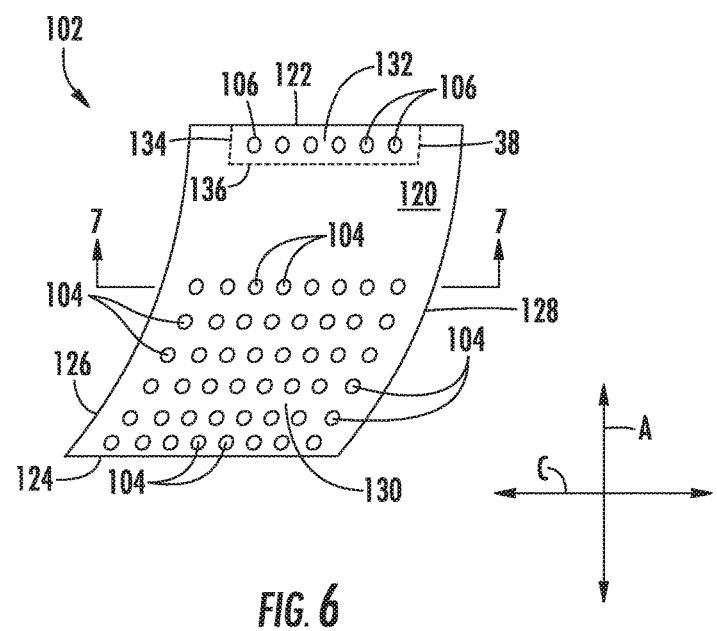
FIG. 6 is a bottom view of an impingement plate of the nozzle cooling system, illustrating one or more impingement apertures and one or more post-impingement apertures.

FIGS. 6 and 7 illustrate the impingement plate 102 in greater detail. More specifically, the impingement plate 102 includes a radially outer surface 118 and a radially inner surface 120 positioned radially inwardly from the radially outer surface 118. The radially outer surface 118 of the impingement plate 102 is positioned radially between the radially inner surface 120 of the impingement plate 102 and the radially inner surface 54 of the inner side wall 46. The impingement plate 102 includes a forward surface 122 and an aft surface 124 positioned downstream from the forward surface 122. The forward surface 122 of the impingement plate 102 is positioned proximate to the forward surface 60 of the inner side wall 46, and the aft surface 124 of the impingement plate 102 is positioned proximate to the aft surface 62 of the inner side wall 46. The impingement plate 102 also includes a first circumferential surface 126 and a second circumferential surface 128 circumferentially spaced apart from the first circumferential surface 126. The first circumferential surface 126 of the impingement plate 102 is positioned proximate to the first circumferential surface 64 of the inner side wall 46, and the second circumferential surface 128 of the impingement plate 102 is positioned proximate to the second circumferential surface 66 of the inner side wall 46. In the embodiment shown in FIGS. 4 and 6, the first and the second circumferential surfaces 126, 128 are curvilinear. Nevertheless, the forward surface 122, the aft surface 124, the first circumferential surface 126, and the second circumferential surface 128 may be linear or curvilinear. The impingement plate 102 is preferably formed from a suitable sheet metal.

Figure 5:
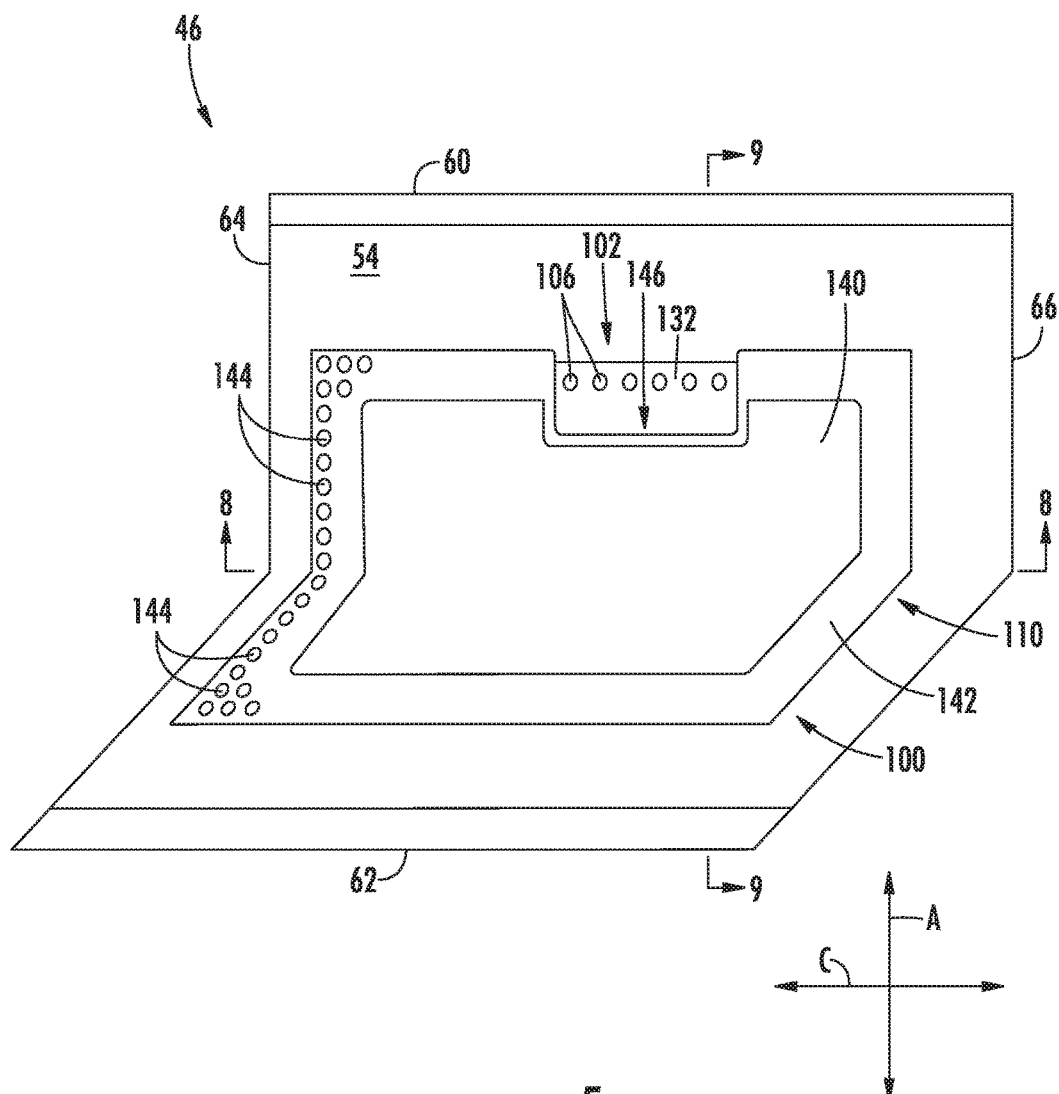
FIG. 5 is alternate bottom view of an inner side wall of the nozzle shown in FIG. 3, further illustrating the features of the nozzle cooling system.

As best illustrated in FIG. 6, the impingement plate 102 includes the first portion 130 and a second portion 132. In particular, the first and the second portions 130, 132 are separated by lines 134, 136, 138 in the embodiment shown in FIG. 6. In this respect, the first portion 130 is positioned proximate to the trailing edge 78 of the airfoil 50 and the aft surface 62 of the inner side wall 46. Conversely, the second portion 132 is positioned proximate to the leading edge 76 of the airfoil 50 and the forward surface 60 of the inner side wall 46. Nevertheless, the first and the second portions 130, 132 may occupy different regions of the impingement plate 102 in other embodiments. As shown in FIG. 5, the duct plate 110 encloses the first portion 130 of the impingement plate 102, but not the second portion 132 thereof. In some embodiments, the one or more posts 116 may be positioned along one or more of the lines 134, 136, 138. Preferably, the first portion 130 is larger than the second portion 132; although, the first portion 130 may be same size as or smaller than the second portion 132.

As mentioned above, the impingement plate 102 defines the one or more impingement apertures 104 and the one or more post-impingement apertures 106. In the embodiment shown in FIGS. 6 and 7, a plurality of impingement apertures 104 extend radially through a first portion 130 of the impingement plate 102, and a plurality of post-impingement apertures 106 extend radially through a second portion 132 of the impingement plate 102. The one or more impingement apertures 104 are preferably axially and circumferentially aligned with an area of high heat load on the inner side wall 46. The one or more post-impingement apertures 106 are axially and circumferentially spaced apart from the impingement apertures 104 so as not to interfere with the impingement apertures 104. In the embodiment shown in FIG. 6, the impingement plate 102 may define more impingement apertures 104 than post-impingement apertures 106 (e.g., two times more, three times more, etc.). The one or more impingement apertures 104 and the one or more post-impingement apertures 106 preferably have circular cross-sections. Although, the impingement apertures 104 and the post-impingement apertures 106 may have any suitable cross-sections.

Figure 8:
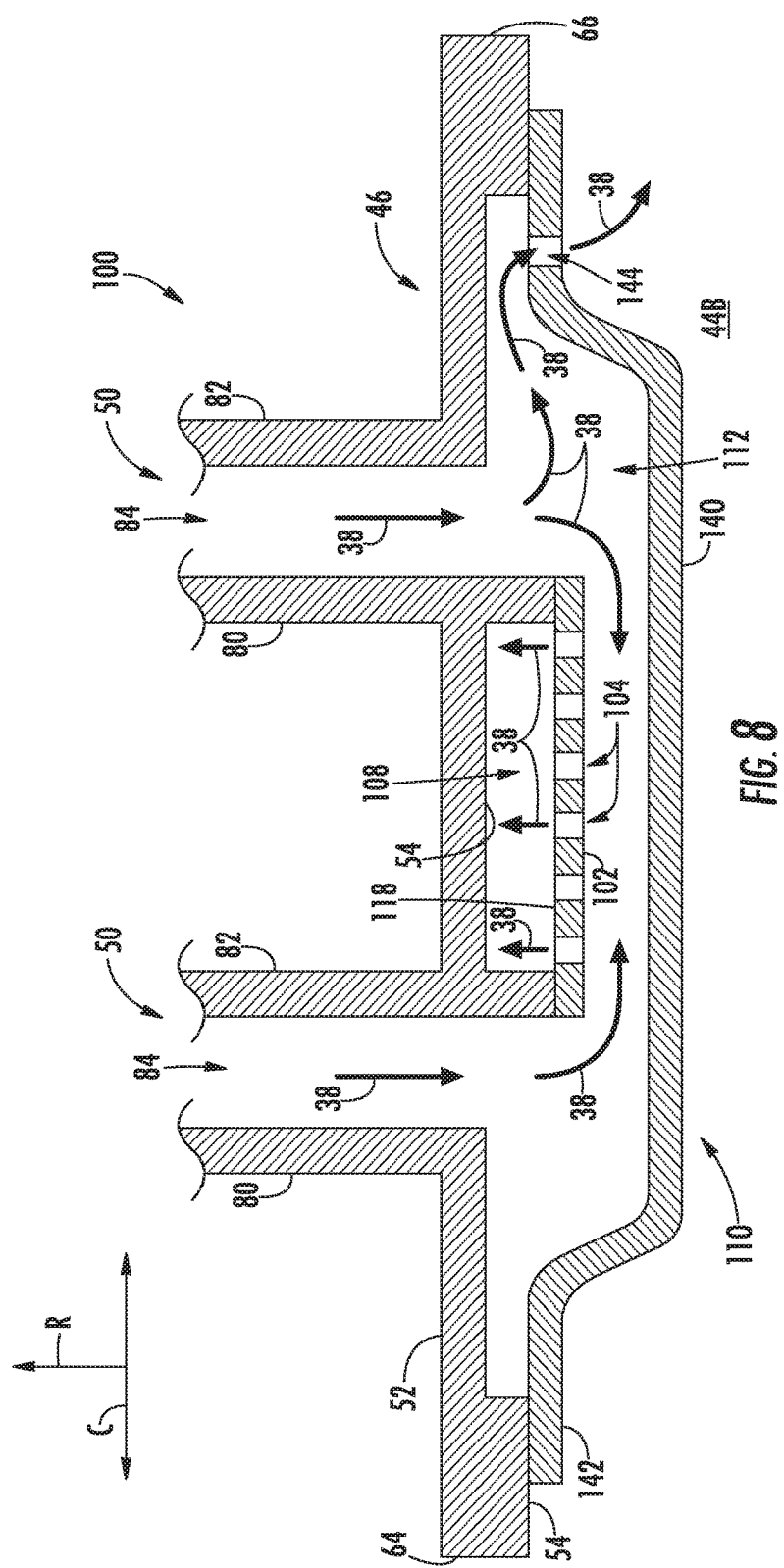
FIG. 8 is a cross-sectional view of the nozzle cooling system taken generally about line 8-8 in FIG. 5, illustrating the operation thereof.

As illustrated in FIGS. 7-9, the impingement plate 102 and the inner side wall 46 define an inner chamber 108 therebetween. Specifically, the inner chamber 108 is positioned radially between the radially inner surface 54 of the inner side wall 46 and the radially outer surface 118 of the impingement plate 102. As illustrated in FIG. 9, the one or more post-impingement apertures 106 permit fluid communication between the inner chamber 108 and the diaphragm cavity 44B (FIG. 2).

As briefly mentioned above, the nozzle cooling system 100 also includes the duct plate 110 that encloses the first portion 130 of the impingement plate 102. In the embodiment shown in FIGS. 5 and 8-9, the duct plate 110 includes a dome portion 140 and flange 142 positioned around the periphery of the dome portion 140. The dome portion 140 encloses the first portion 130 of the impingement plate 102, and the flange 142 couples the duct plate 110 to the radially inner surface 54 of the inner side wall 46. In the embodiment shown in FIG. 5, the duct plate 110 defines a notch 146 that provides clearance for the second portion 132 of the impingement plate 102. That is, the notch 146 permits the second portion 132 to be outside of the duct plate 110, thereby permitting fluid communication between the inner chamber 108 and the diaphragm cavity 44B (FIG. 2) through the one or more post-impingement apertures 106. Nevertheless, the duct plate 110 may have other shapes and/or configurations that permit duct plate 110 to enclose the first portion 130 of the impingement 102, but not the second portion 132 thereof.

As illustrated in FIGS. 8-9, the duct plate 110, the impingement plate 102, and the inner side wall 46 define an outer chamber 112 therebetween. Specifically, the outer chamber 112 is positioned radially between the duct plate 110 and the combination of the radially inner surface 54 of the inner side wall 46 and the radially outer surface 118 of the impingement plate 102. As illustrated in FIG. 8, the airfoil passages 84 are in fluid communication with the outer chamber 112. Furthermore, the one or more impingement apertures 104 permit fluid communication between the outer chamber 112 and the inner chamber 108.

Referring now to FIGS. 5 and 8, the flange 142 of the duct plate 110 may optionally define one or more outlet apertures 144 extending therethrough. In particular, the outlet apertures 144 permit fluid communication between the outer chamber 112 and the diaphragm cavity 44B. The outlet apertures 144 are preferably axially and circumferentially aligned with an area of low heat load on the inner side wall 46. In the embodiment shown in FIG. 5, the portion of the flange 142 proximate to the first circumferential surface 64 defines a plurality of outlet apertures 144. In this respect, the one more outlet apertures 144 may be circumferentially spaced apart from the one or more impingement apertures 104 and the one or more post-impingement apertures 106. In fact, the one more outlet apertures 144 may be circumferentially spaced apart from the one or more impingement apertures 104 and the one or more post-impingement apertures 106 by one of the airfoils 50. Nevertheless, the flange 142 may define any number of outlet apertures 144, and the outlet apertures 144 may be positioned at any suitable location along the flange 142.

In operation, the nozzle cooling system 100 disclosed herein cools the inner side wall 46 of the turbine nozzle 32A. As mentioned above, the radially outer surface 52 of the inner side wall 46 is exposed the combustion gases 40 flowing through the turbine 24 (FIG. 1). Heat absorbed by the radially outer surface 52 conducts through the inner side wall 46 to the radially inner surface 54, thereby increasing the temperature thereof. In this respect, the nozzle cooling system 100 directs the compressed air 38 onto the radially inner surface 54. As such, the compressed air 38 cools the inner side wall 46 by absorbing heat from the radially inner surface 54 thereof.

Referring now to FIG. 8, the airfoil passages 84 provide the compressed air 38 to the nozzle cooling system 100. The cores 86 positioned in the airfoil passages 84 shown in FIG. 4 are omitted from FIG. 8 for clarity. As mentioned above, the compressed air 38 disposed radially outwardly from the turbine nozzle 32B as shown in FIG. 2 flows through the airfoil passages 84. As illustrated in FIG. 8, the compressed air 38 in the airfoil passages 84 flows into the outer chamber 112. In this respect, the outer chamber 112 acts as a plenum that provides pressurized air (e.g., the compressed air 38) to the one or more impingement apertures 104 extending through the impingement plate 102 and/or the one or more outlet apertures 144 extending through the duct plate 110.

The one or more impingement apertures 104 facilitate impingement cooling of a portion of the inner side wall 46. More specifically, the compressed air 38 in the outer chamber 112 flows through the one or more impingement apertures 104 in the impingement plate 102 into the inner chamber 108. That is, the one or more impingement apertures 104 direct the compressed air 38 from the outer chamber 112 onto the radially inner surface 54 of the inner side wall 46. As illustrated in FIG. 9, the compressed air 38 exits the inner chamber 108 through the one or more post-impingement apertures 106 and flows into the diaphragm cavity 44B. In this respect, the compressed air 38 enters and exits the inner chamber 108 by flowing through the impingement plate 102. As such, the one or more post-impingement apertures 106 should be spaced apart from the one or more impingement apertures 104 so as not to interfere with the impingement cooling of the radially inner surface 54. Preferably, the nozzle cooling system 100 provides impingement cooling to a portion of the inner side wall 46 subject to a high heat load (e.g., the areas proximate to the trailing edges 78 of the airfoils 50).

The one or more outlet apertures 144 facilitate duct cooling of a portion of the inner side wall 46. More specifically, the compressed air 38 in the outer chamber 112 is exposed to portions of the radially inner surface 54 of the inner side wall 46. In the embodiment shown in FIG. 8, the compressed air 38 in the outer chamber 112 is in contact with portions of the radially inner surface 54 proximate to the first and the second circumferential surface 64, 66, thereby providing duct cooling thereto. Nevertheless, the compressed air 38 in the outer chamber 112 may be exposed to any portion of radially inner surface 54 as well. As illustrated in FIG. 8, the compressed air 38 exits the outer chamber 112 through the one or more outlet apertures 144 and flows into the diaphragm cavity 44B. The one or more post-impingement apertures 106 extending through the impingement plate 102 should be spaced apart from the one or more outlet apertures 144 so as not to interfere with the duct cooling of the radially inner surface 54. Preferably, the nozzle cooling system 100 provides duct cooling to a portion of the inner side wall 46 subject to a low heat load (e.g., the areas proximate to the first and the second circumferential surfaces 64, 66).

As discussed in greater detail above, the nozzle cooling system 100 disclosed herein provides the compressed air 38 to the radially inner surface 54 of the inner side wall 46, thereby cooling the same. In particular, the one or more impingement apertures 104 extending through the impingement plate 102 direct the compressed air 38 into the inner chamber 108 and onto the radially inner surface 54. The impingement plate 102 also defines the one or more post-impingement apertures 106, which permit the compressed air 38 to exit the inner chamber 108 after cooling the inner side wall 46. Since the one or more impingement apertures 104 and the one or more post-impingement apertures 106 both extend through the impingement plate 102, the nozzle cooling system 100 does not require apertures formed in the inner side wall 46 to exhaust the spent compressed air 38 from the inner chamber 112. As such, the nozzle cooling system 100 reduces the overall cost of the gas turbine engine in comparison to conventional nozzle cooling systems.

Although the nozzle cooling system 100 is described above in the context of the turbine nozzle 32B of the second stage 30B, the nozzle cooling system 100 may be incorporated into the turbine nozzles 32A, 32C of the first and the third stages 30A, 30C. In fact, the nozzle cooling system 100 may be incorporated into any nozzle in the turbine section 22. Furthermore, the nozzle cooling system 100 may be incorporated into a compressor nozzle as well.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A nozzle cooling system for a gas turbine engine, comprising:
a nozzle comprising an inner side wall and an airfoil coupled to the inner side wall, the inner side wall comprising a radially inner surface and a radially outer surface, the airfoil defining an airfoil passage;
an impingement plate positioned radially inwardly from the radially inner surface of the inner side wall, the impingement plate and the inner side wall collectively defining an inner chamber, wherein the impingement plate comprises a first portion defining one or more impingement apertures and a second portion defining one or more post-impingement apertures; and
a duct plate enclosing the first portion of the impingement plate, wherein the duct plate, the first portion of the impingement plate, and inner side wall collectively define an outer chamber in fluid communication with the inner chamber through the one or more impingement apertures, the outer chamber further being in fluid communication with the airfoil passage;
wherein compressed air enters the outer chamber through the airfoil passage, the compressed air then flowing from the outer chamber through the one or more impingement apertures into the inner chamber and exiting the inner chamber through the one or more post-impingement apertures.

2. The nozzle cooling system of claim 1, wherein the nozzle comprises an outer side wall, the airfoil extending from the outer side wall to the inner side wall.

3. The nozzle cooling system of claim 1, wherein the compressed air exiting the one or more post-impingement apertures flows into a diaphragm cavity.

4. The nozzle cooling system of claim 1, wherein the duct plate defines one or more outlet apertures that provide fluid communication between the outer chamber and a diaphragm cavity.

5. The nozzle cooling system of claim 4, wherein the one or more outlet apertures are circumferentially spaced apart from the one or more impingement apertures and the one or more post-impingement apertures.

6. The nozzle cooling system of claim 5, wherein the airfoil is positioned circumferentially between the one or more outlet apertures and the one or more impingement apertures.

7. The nozzle cooling system of claim 1, wherein the first portion of the impingement plate comprises a greater area than the second portion of the impingement plate.

8. The nozzle cooling system of claim 1, wherein the impingement plate is at least partially spaced apart from the radially inner surface of the inner side wall by one or more posts.

9. The nozzle cooling system of claim 1, wherein the impingement plate comprises a curvilinear surface.

10. The nozzle cooling system of claim 1, wherein the one or more impingement apertures are positioned axially between the one or more post-impingement apertures and an aft surface of the inner side wall.

11. The nozzle cooling system of claim 1, wherein the impingement plate is formed from sheet metal.

12. A gas turbine engine, comprising:
a compressor section;
a combustion section; and
a turbine section, comprising:
a nozzle comprising an inner side wall, an outer side wall, and an airfoil extending between the inner side wall and the outer side wall, wherein the inner side wall comprises a radially inner surface and a radially outer surface, the airfoil defining an airfoil passage;

an impingement plate positioned radially inwardly from the radially inner surface of the inner side wall, the impingement plate and the inner side wall collectively defining an inner chamber, wherein the impingement plate comprises a first portion defining one or more impingement apertures and a second portion defining one or more post-impingement apertures; and a duct plate enclosing the first portion of the impingement plate, wherein the duct plate, the first portion of the impingement plate, and the inner side wall collectively define an outer chamber in fluid communication with the inner chamber through the one or more impingement apertures, the outer chamber further being in fluid communication with the airfoil passage;

wherein compressed air enters the outer chamber through the airfoil passage, the compressed air then flowing from the outer chamber through the one or more impingement apertures into the inner chamber and exiting the inner chamber through the one or more post-impingement apertures.

13. The gas turbine engine of claim 12, wherein the compressed air exiting the one or more post-impingement apertures flows into a diaphragm cavity.

14. The gas turbine engine of claim 12, wherein the duct plate defines one or more outlet apertures that provide fluid communication between the outer chamber and a diaphragm cavity.

15. The gas turbine engine of claim 14, wherein the one or more outlet apertures are circumferentially spaced apart from the one or more impingement apertures and the one or more post-impingement apertures.

16. The gas turbine engine of claim 15, wherein the airfoil is positioned circumferentially between the one or more outlet apertures and the one or more impingement apertures.

17. The gas turbine engine of claim 12, wherein the first portion of the impingement plate comprises a greater area than the second portion of the impingement plate.

18. The gas turbine engine of claim 12, wherein the impingement plate is at least partially spaced apart from the radially inner surface of the inner side wall by one or more posts.

* * * * *